US008774955B2

(12) United States Patent
Chen

(10) Patent No.: US 8,774,955 B2
(45) Date of Patent: Jul. 8, 2014

(54) AUDIO CONTROL OF MULTIMEDIA OBJECTS

(75) Inventor: Johnny Chen, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 21 days.

(21) Appl. No.: 13/086,268

(22) Filed: Apr. 13, 2011

(65) Prior Publication Data
US 2012/0266071 A1 Oct. 18, 2012

(51) Int. Cl.
G06F 17/00 (2006.01)
G06F 3/00 (2006.01)
G06F 3/16 (2006.01)

(52) U.S. Cl.
USPC ............ 700/94; 715/716; 715/727; 719/322

(58) Field of Classification Search
USPC ............ 700/94; 715/716, 727; 381/104, 109; 719/321, 322, 328
See application file for complete search history.

(56) References Cited

U.S. PATENT DOCUMENTS

| 6,345,279 | B1* | 2/2002 | Li et al. ................................. 1/1 |
| 6,704,034 | B1* | 3/2004 | Rodriguez et al. ............ 715/860 |
| 7,502,480 | B2* | 3/2009 | Baudisch et al. ............ 381/104 |
| 7,509,593 | B2* | 3/2009 | Kaminagayoshi ............ 715/862 |
| 7,706,903 | B2* | 4/2010 | Champion et al. ............. 700/94 |
| 2001/0018738 | A1* | 8/2001 | Mori et al. ..................... 713/100 |
| 2002/0198909 | A1 | 12/2002 | Huynh et al. |
| 2004/0102861 | A1* | 5/2004 | Han ................................. 700/94 |
| 2004/0201608 | A1* | 10/2004 | Ma et al. ........................ 345/719 |
| 2006/0210097 | A1* | 9/2006 | Yerrace et al. ................. 381/119 |
| 2006/0282900 | A1 | 12/2006 | Johnson et al. |
| 2006/0285701 | A1* | 12/2006 | Chumbley et al. ............ 381/104 |
| 2007/0061849 | A1* | 3/2007 | Walker et al. ................... 725/86 |
| 2007/0072676 | A1* | 3/2007 | Baluja ............................. 463/42 |
| 2007/0244586 | A1 | 10/2007 | Champion et al. |
| 2008/0025529 | A1* | 1/2008 | Keohane et al. ............. 381/104 |
| 2009/0282103 | A1* | 11/2009 | Thakkar et al. .............. 709/204 |
| 2011/0085679 | A1* | 4/2011 | Jakes et al. .................... 381/107 |
| 2011/0307785 | A1* | 12/2011 | Demarta et al. ............. 715/719 |
| 2012/0110452 | A1* | 5/2012 | Hiipakka et al. ............. 715/716 |
| 2012/0158984 | A1* | 6/2012 | Maitre et al. ................. 709/231 |

OTHER PUBLICATIONS

"Issue 3541: Per tabs control over sounds in web pages", https://code.google.com/p/chromium/issues/detail?id=3541, google.com, pp. 1-5.*

(Continued)

Primary Examiner — Davetta W Goins
Assistant Examiner — Daniel Sellers
(74) Attorney, Agent, or Firm — Shumaker & Sieffert, P.A.

(57) ABSTRACT

In some examples, aspects of the present disclosure may include techniques for audio control of one or more multimedia objects. In one example, a method includes receiving an electronic document that includes a group of one or more multimedia objects capable of generating audio data. The method also includes registering a multimedia object of the group of one or more multimedia objects, wherein registering the multimedia object comprises storing a multimedia object identifier that identifies the multimedia object. The method further includes receiving audio data; and determining, by a computing device, a volume level of the audio data generated by the registered multimedia object based on one or more configuration parameters, wherein the one or more configuration parameters define one or more volume levels associated with the multimedia object identifier. The method also includes outputting, to an output device, the audio data at the determined volume level.

20 Claims, 5 Drawing Sheets

(56) References Cited

OTHER PUBLICATIONS

W3C, "HTML5 W3C Working Draft Mar. 4, 2010", w3.org, archived at archive.org on Apr. 6, 2010, http://web.archive.org/web/20100406082702/http://www.w3.org/TR/html5/Overview.html, selected pp. 1-53.*

"[IAmA] We are three members of the Google Chrome team. We <3 the web. AMA", Mar. 29, 2011, reddit.com, archived at archive.org on Apr. 10, 2011, http://web.archive.org/web/20110410214324/http://www.reddit.com/r/IAmA/comments/gdyun/iama_we_are_three_members_of_the_google_chrome/, pp. 1-22.*

"IAudioSessionManager2 Interface," [online]. Microsoft, 2011 [retrieved on Apr. 7, 2011]. Retrieved from the Internet: <URL:http://msdn.microsoft.com/en-us/library/dd370950(v=vs.85).aspx> (4 pgs).

"IndieVolume," [online]. Published online at Software.informer.com. Informer Technologies, Inc., 2010. [retrieved on Dec. 16, 2010]. Retrieved from the Internet: <URL:http://indievolume.software.informer.com/> (2 pgs).

"Providing a Custom Ducking Behavior," Microsoft, 2011 [retrieved on Apr. 7, 2011]. Retrieved from the Internet: <URL:http://msdn.microsoft.com/en-us/library/dd940517(v=vs.85).aspx> (2 pgs).

Oiaga, "The Windows Vista vol. Mixer," published online at Softpedia.com. Dec. 17, 2006. Retrieved from the Internet: <URL:http://news.softpedia.com/news/The-Windows-Vista-Volume-Mixer-41882.shtml> (11 pgs.).

"What's New for Core Audio APIs in Windows," Microsoft, 2011 [retrieved on Apr. 7, 2011]. Retrieved from the Internet: <URL:http://msdn.microsoft.com/en-us/library/dd756612(v=vs.85).aspx> (2 pgs).

Oiaga, "The Windows Vista vol. Mixer," published online at Softpedia.com. Dec. 7, 2006. Retrieved from the Internet: <URL:http://news.softpedia.com/news/The-Windows-Vista-Volume-Mixer-41882.shtml> (11 pgs.).

Oiaga, "The Windows Vista Volumen Mixer," <online>. Softpedia, Dec. 7, 2006. Retrieved from the Internet: <http://news.softpedia.com/news/The-Windows-Vista-Volume-Mixer-41882.shtml> 11 pgs.

Notice of Allowance from U.S. Appl. No. 13/251,111, dated Sep. 4, 2012, 7 pp.

Buckland, Michael, "What is a 'digital document;'" 1998, School of Information Management and Systems, UC Berkely, pp. 1-7.

Office Action from U.S. Appl. No. 13/251,111, dated Feb. 3, 2012, 14 pp.

Response to Office Action dated Feb. 3, 2012, from U.S. Appl. No. 13/251,111, filed May 3, 2012, 12 pp.

Notice of Allowance from U.S. Appl. No. 13/251,111, dated May 25, 2012, 10 pp.

International Search Report and Written Opinion of international application No. PCT/US2012/033600, dated Jul. 17, 2012, 14 pp.

Thornwood, "Audio Mixer and Master vol. Control with Automatic Configuration," IBM Technical Disclosure Bulletin, International Business Machines Corp., Jan. 1, 1994, pp. 485 and 486.

International Preliminary Report on Patentability of internaional application No. PCT/US2012/033600, dated Oct. 24, 2013, 9 pp.

* cited by examiner

AUDIO CONTROL OF MULTIMEDIA OBJECTS

TECHNICAL FIELD

This disclosure relates to electronic devices and, more specifically, to audio controls of electronic devices.

BACKGROUND

A user may interact with applications executing on a computing device (e.g., mobile phone, tablet computer, smart phone, or the like). For instance, a user may install, view, or delete an application on a computing device.

In some instances, a user may interact with the computing device through a graphical user interface. In some examples, the computing device may include one or more sound devices. An application executing on the computing device may access the sound device.

SUMMARY

In one example, a method includes receiving an electronic document that includes a group of one or more multimedia objects capable of generating audio data. The method further includes registering a multimedia object of the group of one or more multimedia objects, wherein registering the multimedia object comprises storing a multimedia object identifier that identifies the multimedia object. The method also includes receiving audio data generated by the registered multimedia object. The method further includes determining, by a computing device, a volume level of the audio data based on one or more configuration parameters, wherein the one or more configuration parameters define one or more volume levels associated with the multimedia object identifier. The method further includes outputting, to an output device, the audio data at the determined volume level.

In one example, a computer-readable storage medium is encoded with instructions that, when executed, cause one or more processors of a computing device to perform operations including receiving an electronic document that includes a group of one or more multimedia objects capable of generating audio data. The instructions further cause one or more processors to perform operations including registering a multimedia object of the group of one or more multimedia objects, wherein registering the multimedia object comprises storing a multimedia object identifier that identifies the multimedia object. The instructions further cause one or more processors to perform operations including receiving audio data generated by the registered multimedia object; determining, by a computing device, a volume level of the audio data based on one or more configuration parameters, wherein the one or more configuration parameters define one or more volume levels associated with the multimedia object identifier. The instructions further cause one or more processors to perform operations including outputting, to an output device, the audio data at the determined volume level.

In one example, a computing device includes: one or more processors. The computing device further includes an audio control module, executable by the one or more processors to receive an electronic document that includes a group of one or more multimedia objects capable of generating audio data. The audio control module is further executable to register a multimedia object of the group of one or more multimedia objects, wherein registering the multimedia object comprises storing a multimedia object identifier that identifies the multimedia object. The audio control module is further executable to receive audio data generated by the registered multimedia object. The computing device also includes means for determining a volume level of the audio data based on one or more configuration parameters, wherein the one or more configuration parameters define one or more volume levels associated with the multimedia object identifier. The computing device further includes an output device to output the audio data at the determined volume level.

In one example, a method includes receiving an electronic document that includes a group of two or more multimedia objects capable of generating audio data. The method also includes registering a first multimedia object and a second multimedia object of the group with an application, wherein registering the first multimedia object comprises storing a first multimedia object identifier that identifies the first multimedia object, and wherein registering the second multimedia object comprises storing a second multimedia object identifier that identifies the second multimedia object. The method further includes receiving first audio data generated by the first multimedia object and second audio data generated by the second multimedia object. The method also includes receiving, during execution of the application, a first configuration parameter from a user that indicates a first volume level of the first multimedia object. The method further includes receiving, during execution of the application, a second configuration parameter from the user that indicates a second volume level of the second multimedia object. The method also includes outputting, to an output device, the first audio data at the first volume level. The method further includes outputting, to the output device, the second audio data at the second volume level.

The details of one or more examples of this disclosure are set forth in the accompanying drawings and the description below. Other features, objects, and advantages of the disclosure will be apparent from the description and drawings, and from the claims.

DETAILED DESCRIPTION

In general, aspects of the present disclosure are directed to techniques for control of multimedia objects. Advancements in application and network technologies have enabled developers to create documents that include rich and dynamic content. For example, an application may display multiple multimedia objects in a single document. Each multimedia object may provide a source of audio and/or visual content. In one example, a document may include many multimedia objects that each provides video and audio content. The application may initially execute multimedia objects included in the document. The application may further provide multimedia objects with access to I/O devices, e.g., an audio device, via various application programming interfaces (APIs). In some examples, multiple multimedia objects may simultaneously require access to an audio device for audio and/or video playback. In such examples, each multimedia object may compete for access to the audio device.

Presently, applications do not provide the user with granular audio control over individual multimedia objects. Therefore, multimedia objects may simultaneously send audio data to the audio device, which may result in an audio signal that is a combination of all audio data. This lack of control may lead to undesirable user experiences. For example, a user listening to audio of a first object may be interrupted by audio of a second object. The combined audio signal may be unintelligible, and the second object may distract the user from audio of the first object. A user may therefore desire one or more techniques to granularly control individual multimedia objects that share a single audio device.

Techniques of the present disclosure provide granular volume controls for multimedia objects that may simultaneously require access to the same audio device. In one example, an audio control module is included in a web browser. When a multimedia object is initially rendered by the web browser, the multimedia object is registered with the audio control module. Consequently, the audio module maintains a list of multimedia objects in the web browser. The audio control module further provides a sound control API that is accessible by multimedia objects. When a multimedia object generates audio data to be output by the audio device, the multimedia object may call a function included in the sound control API to send audio data to the audio device. The audio data may be received by the audio control module via the function call. Once the audio data is received by the audio control module, the audio control module may, for example, change the volume of the audio data. The transformed audio data may then be sent to the audio device via another API that may be provided by the operating system to the web browser.

Figure 1:
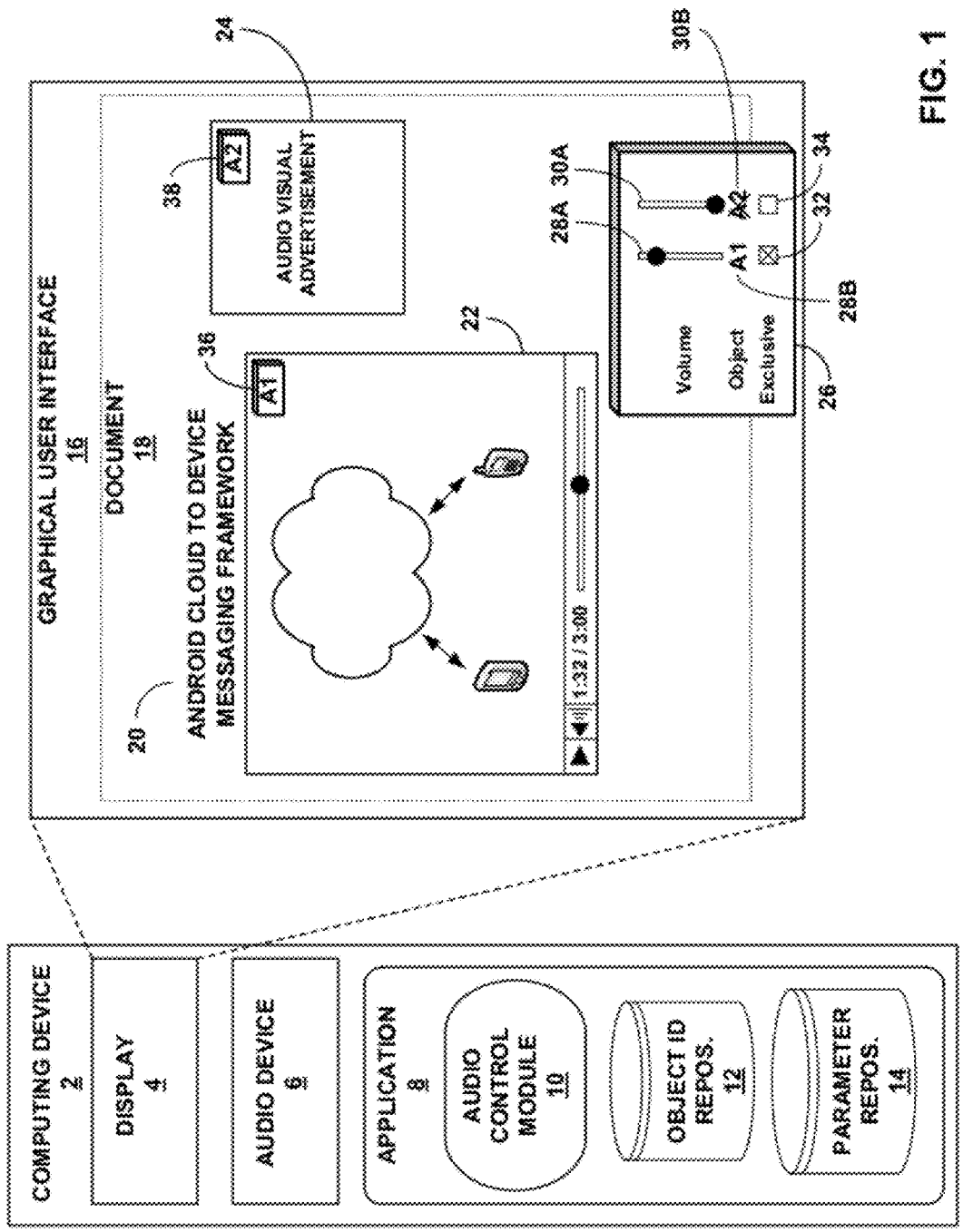
FIG. 1 is a block diagram illustrating an example of a computing device that may be configured to execute one or more applications, in accordance with one or more aspects of the present disclosure.

FIG. 1 is a block diagram illustrating an example of a computing device 2 that may be configured to execute one or more applications, e.g., application 8, in accordance with one or more aspects of the present disclosure. As shown in FIG. 1, computing device 2 may include a display 4, an audio device 6, and an application 8. Application 8 may, in some examples, include an audio control module 10.

Computing device 2, in some examples, includes or is a part of a portable computing device (e.g. mobile phone/netbook/laptop/tablet device) or a desktop computer. Computing device 2 may also connect to a wired or wireless network using a network interface (see, e.g., FIG. 2). One non-limiting example of computing device 2 is further described in the example of FIG. 2.

Figure 2:
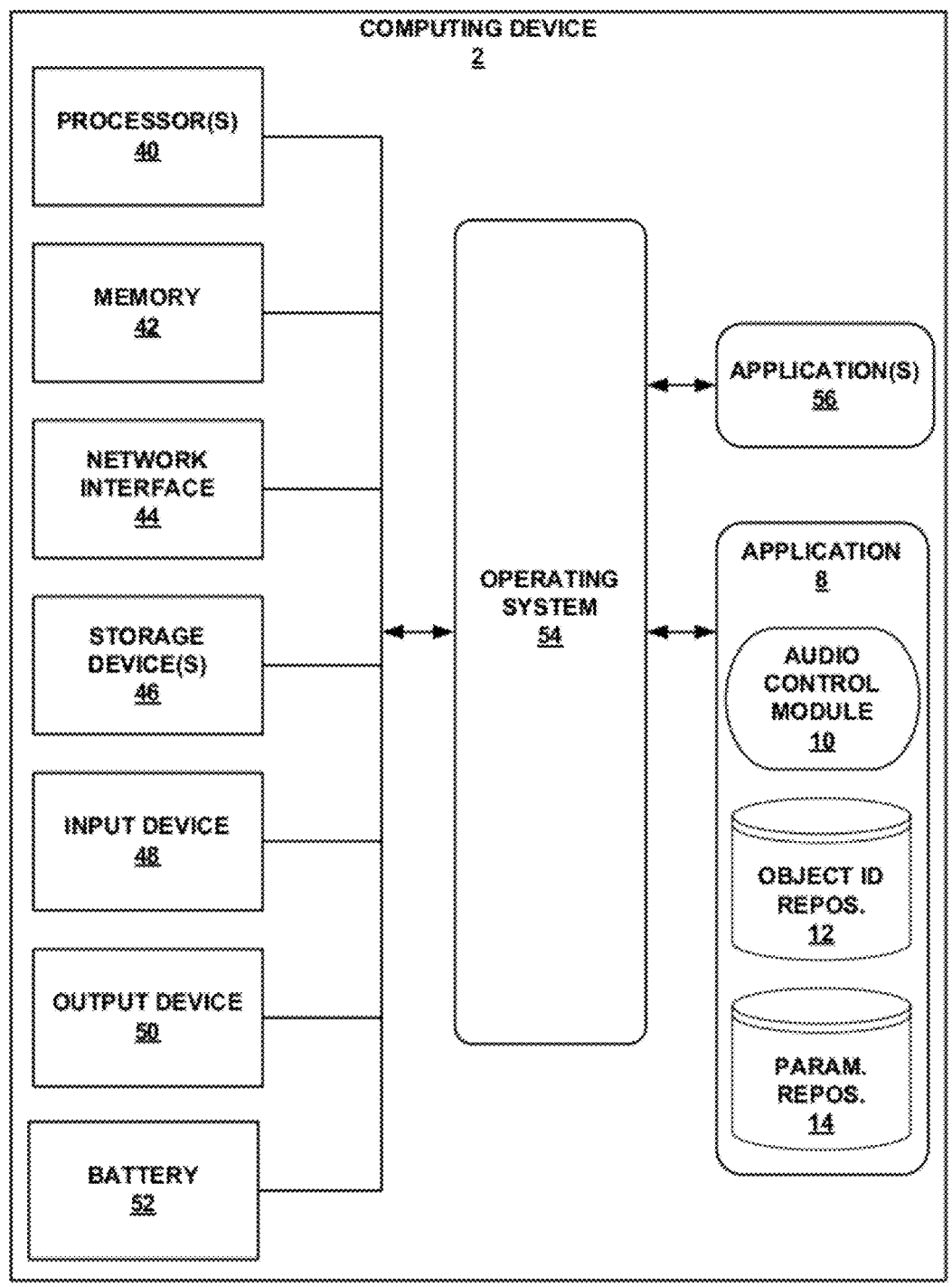
FIG. 2 is a block diagram illustrating further details of one example of computing device 2 shown in FIG. 1, in accordance with one or more aspects of the present disclosure.

In some examples, computing device 2 may include display 4. In one example display 4 may be an output device 50 as shown in FIG. 2. In some examples, display 4 may be programmed by computing device 2 to display graphical content. Graphical content, generally, includes any visual depiction displayed by display 4. Examples of graphical content may include images, text, videos, visual objects and/or visual program components such as scroll bars, text boxes, buttons, etc. In one example, application 8 may cause display 4 to display graphical user interface (GUI) 16.

As shown in FIG. 1, application 8 may execute on computing device 2. Application 8 may include program instructions and/or data that are executable by computing device 2. Examples of application 8 may include a web browser, email application, text messaging application or any other application that receives user input and/or displays graphical content.

In some examples, application 8 causes GUI 16 to be displayed in display 4. GUI 16 may include interactive and/or non-interactive graphical content that presents information of computing device 2 in human-readable form. In some examples GUI 16 may enable a user to interact with application 8 through display 4. For example, a user may provide a user input via an input device such as a mouse, keyboard, or touch-screen. In response to receiving the user input, computing device 2 may perform one or more operations. In this way, GUI 16 may enable a user to create, modify, and/or delete data of computing device 2.

In some examples, application 8, as shown in FIG. 1, may be a web browser software application (hereinafter "web browser"). One example of a web browser may be the Google Chrome™ web browser. A web browser, in some examples, may retrieve and present information resources on a network such as the Internet. A web browser may also send information to other devices on a network. In some examples, an information resource may be a document such as a HyperText Markup Language (HTML) document. A HTML document may include structured data that is interpretable by a web browser. In some examples, structured data may include text, pictures, and multimedia objects. A web browser may, for example, display the structured data of an HTML document in a human-interpretable form.

As shown in FIG. 1, application 8 may be a web browser that displays an HTML document 18. HTML document 18 may, for example, include text 20, multimedia object 22, and multimedia object 24. A multimedia object may be any source of visual, audio, and/or other sensory data embedded in document 18. In some examples, multimedia objects may include video objects and/or sound objects. Examples of multimedia objects may include Macromedia® Flash®, Java® applets, Quicktime® movies, MPEG-4 videos, MP3 audio, and WAV audio. In some examples, a multimedia object may include an animation and audio content. In some examples, a creator of a document, e.g., document 18, may embed one or more multimedia objects in document 18. A user of computing device 2 may use application 8 to view document 18 and interact with multimedia objects 22 and 24.

In some examples, multiple multimedia objects may be included in a single document 18. For example, as shown in FIG. 1, two multimedia media objects 22 and 24 are embedded in document 18. In the example of FIG. 1, the multimedia object 22 may be a video entitled "Android Cloud to Device Messaging Framework" as indicated by text 20. Document 18 may further include multimedia object 24. Multimedia object 24 may, as shown in FIG. 1, include an audio visual advertisement. For example, multimedia object 24 may include a visual animation of an advertised product or service and may, in some examples, further include audio associated with the animation.

Application 8 may, in some examples, include a rendering engine to interpret structured data of document 18. The rendering engine of application 8 may, in some examples present the structured data in human-interpretable form. As described herein, "render" may, in some examples, include presenting any structured data in human-interpretable form. Structured data of an HTML document may include tags that enclose content to be rendered by the rendering engine. Tags may be of different types and therefore enable the rendering engine to render content encompassed by different tags in different ways. Thus, in one example, text 20 may be enclosed by "text" tags that enable the rendering engine to display "Android Cloud to Device Messaging Framework" as text.

In other examples, multimedia tags may be included in document 18 to specify multimedia objects 22 and 24. In such examples, the rendering engine of application 8 may process the multimedia tags to present multimedia objects 22, 24 in human-interpretable form to a user. The rendering engine may, in some examples, include functionality to render some but not all types of content associated with various different tags. For example, a rendering engine may natively render text but may not natively render multimedia objects. In such examples, tags for a multimedia object may specify a separate multimedia application to render the content of the multimedia object. For example, application 8 may not, in one example, natively render multimedia object 22. Instead, tags included in document 18 and associated with multimedia object 22 may indicate a separate video application to render the content of multimedia object 22. Application 8 may, when processing the tags associated with multimedia object 22, execute the separate video application that, in turn, may render the content of multimedia object 22. In this way, application 8 may be extensible to render various different types of content.

As shown in FIG. 1 and described herein, a document may include multiple multimedia objects. In some examples, application 8 may render some or all of the structured data of document 18 simultaneously. For example, application 8 may render tags for multimedia objects 22, 24 and, consequently, application 8 may present content of multimedia objects 22, 24 to a user simultaneously. In such examples, each multimedia object may include content that may be provided to a user via one or more output devices. For example, multimedia objects 22, 24 may each include audio content. Each of multimedia objects 22, 24 may therefore provide audio data to an audio device 6, e.g., a sound card and/or speaker, to present the audio content to a user. In some examples, audio device 6 may receive audio data from application 8. The audio data may include a representation of audio content. Audio device 6 may provide an audio signal that includes a human-interpretable representation of the audio content based on the audio data.

In some examples, multimedia objects 22, 24 may compete for access to audio device 6. For example, application 8 may render document 18 that includes multimedia object 22 and multimedia visual advertisement object 24. Each multimedia object may include audio content and may therefore provide corresponding audio data to audio device 6. Audio device 6 may receive the audio data both multimedia objects 22, 24 simultaneously. In some examples, audio device 6 may output an audio signal that includes combined or interlaced audio content of each multimedia object 22, 24.

Various drawbacks are apparent in the present example. For example, when audio data of multiple multimedia objects are combined or interlaced, the resulting audio signal may be garbled or uninterpretable by a human. In other examples, a user's focus on audio content generated by a first multimedia object may be disrupted by audio content of a second multimedia media object. In such examples, a user may therefore desire not to hear audio content of the second multimedia object. In some examples, a multimedia object may not provide the user with the ability to directly control to the audio content associated with the multimedia object. In other examples, the user may need to identify each multimedia object individually in order to disable or lower the volume of each multimedia object. Consequently, the user may apply substantial effort to limit the undesirable effects of numerous multimedia objects competing to access an audio device.

Aspects of the present disclosure described hereinafter may overcome various deficiencies presented by multiple media objects that may compete for an audio output device. As shown in FIG. 1, application 8, e.g., a web browser, may initially access document 18 that includes one or more multimedia objects 22, 24. Application 8, in some examples, may render the structured data of document 18 as previously described herein. For example, application 8 may render document 18 and identify one or more tags associated with text 20, multimedia object 22 (hereinafter, video object 22), and multimedia object 24 (hereinafter, advertisement object 24).

In the current example, audio control module 10 may automatically register one or more multimedia objects of document 18 when rendered by application 8. To automatically register a multimedia object, audio control module 10 may identify tags associated with multimedia objects. In some examples, one or more tags associated with a multimedia object may indicate the multimedia object includes content of a particular type. Audio control module 10 may, in some examples, register a multimedia object based on its content type. For example, various content types may include audio content, and therefore, audio control module 10 may be configured to register multimedia objects associated with such content types.

In some examples, audio control module 10 may generate a multimedia object identifier that identifies the multimedia object. Audio control module 10 may use a multimedia object identifier to register the multimedia object. A multimedia object identifier may in some examples include a unique alphanumeric string of numbers and or letters, e.g., a hash code. Audio control module 10, may in some examples, store a multimedia object identifier for later retrieval in a map, hashtable, database or other data storage structure of computing device 2 or of some other computing device coupled to computing device 2. In one example, audio control module 10 may store a multimedia object identifier in object identifier repository 12.

In the example of FIG. 1, audio control module 10 may register video object 22 and advertisement object 24 as document 18 is rendered by application 8. Audio control module 10 may generate a multimedia object identifier "A1," which corresponds to video object 22. Audio control module 10 may, in the current example, generate a multimedia object identifier "A2," which corresponds to advertisement object 22. Each identifier may be stored by application 8 for later retrieval.

As previously described herein, application 8 may, in some examples, execute, e.g., a separate, multimedia application to render content of a multimedia object. In some examples, application 8 may execute the multimedia application as a child process of application 8. When application 8 executes the multimedia application as a child process, audio control module 10 may provide the multimedia application access to an Application Programming Interface (API). The multimedia application may access resources of computing device 2, e.g., storage, output devices, input devices, etc., via the API. For example, a multimedia application may send audio data to audio speaker 6 via an API provided by application 8. In this way, application 8 may control access to resources of computing device 2 and modify data received from the multimedia application.

In some examples, audio control module 10 may include logic to modify a volume level associated with a registered multimedia object. For example, audio control module 10 may receive audio data from a multimedia application that renders content of a registered multimedia object. Audio control module 10 may receive the audio data from the multimedia application via an API provided by application 8. In response to receiving the audio data, audio control module 10 may perform one or more operations increase or decrease a volume level associated with the audio data. For example, audio control module 10 may generate data specifying a volume level in response to, e.g., a user input or data stored on computing device 2. The data specifying the volume level may be associated with the audio data received from the multimedia application. Audio control module 10 may send the volume level data to audio device 6. Audio control module 10 may also send corresponding audio data received from the multimedia application to audio device 6. In this way, audio device 6 may generate an audio signal based on the audio data and the specified volume level. Thus, in examples that include many registered multimedia objects, audio control module 10 may provide fine-grain audio control of each volume level associated with each multimedia object based on any number of configuration parameters.

In some examples, audio control module 10 may determine a volume level of audio data generated by a multimedia object based on one or more configuration parameters. In one example, a configuration parameter may define one or more volume levels associated with a multimedia object identifier that identifies a multimedia object. Computing device 2, in some examples, may include a parameter repository 14 to store configuration parameters. Thus, in some examples, audio control module 10 may automatically execute one or more configuration parameters when audio control module 10 registers a multimedia object. In this way, audio control module 10 may, in some examples, automatically configure volume levels based on one or more configuration parameters thereby reducing the level of manual user configuration.

In some examples, application 8 may include a parameter repository 14. Parameter repository 14 may store one or more configuration parameters associated with multimedia objects. In some examples, parameter repository 12 may include a database, lookup table, or other suitable data structure capable of storing data. In one example, a user may define one or more parameters that are stored in parameter repository 14. Various configuration parameters are further described and illustrated in, e.g., FIG. 5.

In some examples, audio control module 10 may determine a volume level of the audio data based on one or more configuration parameters, wherein the one or more configuration parameters define one or more volume levels associated with the multimedia object identifier. For example, audio control module 10 may select a configuration parameter from parameter repository 14 or receive a configuration parameter at runtime that corresponds to a user's volume level selection. The configuration parameter may specify a volume level associated with a multimedia object. Audio module 10, may generate volume level setting data corresponding to the volume level, which may be sent to an audio driver of audio device 6 or an operating system executing on computing device 2. In either case, the volume level setting data may cause audio device 6 to output the audio data at the corresponding volume level.

In one example use case of FIG. 1, document 18 may include video object 22 and advertisement object 24. Application 8 may be a web browser. In the current example, audio control module 10 may automatically register video object 22 and store a corresponding multimedia object identifier "A1." Audio control module 10 may automatically register advertisement object 24 and store multimedia object identifier "A2." In response to registering video object 22 and advertisement object 24, audio control module 10 may automatically select and execute one or more configuration parameters stored in parameter repository 14. In other examples, a user may specify configuration parameters at run-time. For example, a configuration parameter provided to audio control module 10 by the user may specify a volume level that audio control module 10 may use to change a volume level of audio data.

In the current example, application 8 may execute first and second multimedia applications as child processes that may render content of video object 22 and advertisement object 24, respectively. Video object 22 and advertisement object 24 may each include audio content that may be sent as audio data to audio device 6. In the current example, the first application may send audio data of video object 22 to audio device 6 via an API of audio control module 10. Simultaneously, the second application may send audio data of advertisement object 24 to audio device 6 via an API of audio control module 10. In the current example, a configuration parameter may, for example, specify that sound of advertisement object 24 is to be disabled. Consequently, audio control module 10 may set the volume level associated with advertisement object 24 to mute, e.g., no volume. Consequently, a user may not be interrupted by audio from advertisement object 24 because audio control module 10 has automatically executed the corresponding configuration parameter.

In some examples, application 8 may further include a control panel 26 that indicates a volume level associated with each registered multimedia object. For example, volume selector 28A may be associated with a first multimedia object, e.g., video object 22, as indicated by labels 28B and 36. Volume selector 30A may be associated with a second multimedia object, e.g., advertisement object 24, as indicated by labels 30B and 38. Video object 22 and advertisement object 24 may each be registered with audio control module 10, e.g., multimedia object identifiers that identify each object may be stored by audio control module 10. A volume selector may indicate a volume level of a corresponding multimedia object within a range of selectable volume levels.

In one example, audio control panel 26 may enable a user to modify a volume level associated with a multimedia object via audio control module 10 by changing a volume selector. For example, a user may change a volume level using a volume selector by sliding a volume selector from one volume level position to different volume level position. Audio control module 10, in response to determining the user has adjusted the volume selector, may receive a configuration parameter indicating the new volume level. Audio control module 10 may, in response to receiving the configuration parameter, output the audio data at the new volume level indicated by the configuration parameter. In this way, the user maintains fine-grain control over the volume level of each multimedia object in document 18. In some examples, a volume level associated with a multimedia object may be stored in object identification repository 12.

As shown in FIG. 1, a control panel may display other controls associated with a multimedia object in addition to a volume selector. For example, FIG. 1 further includes exclusive selectors 32, 34. In one example, exclusive selector 32 may be associated with video object 22 and exclusive select 24 may be associated with advertisement object 24. An exclusive selector when selected, in one example, may indicate that only audio data from the corresponding selected multimedia object may be sent to an audio device 6 of computing device 2. In such examples, audio control module 10 may identify the multimedia object corresponding to the selected exclusive selector and only provide audio data from the selected multimedia object to audio device 6.

As shown in FIG. 1, application 8 may display a representation, e.g., a label, that includes a multimedia object identifier in control panel 26. For example, label 28B may include a multimedia object identifier associated with video object 22. In some examples, application 8 may also display a representation of the multimedia object identifier at or near the location of the multimedia object displayed in GUI 16. For example, label 36 may indicate video object 22 is associated with volume selector 28A of control panel 26. In this way, a user may quickly identify a volume selector that corresponds to a multimedia object.

Various aspects of the disclosure may provide, in certain instances, one or more benefits and advantages. For example, techniques of the present disclosure may provide a user with fine-grain control of volume levels associated with numerous multimedia objects. Precise sound control may provide improved user customization of a computing device. In some examples, fine-grain audio control may potentially reduce disruptions and/or undesirable garbling of audio data caused by multiple multimedia objects that may compete for a sound device.

Another potential advantage of the present disclosure may include automatically registering multimedia objects and determining a volume level of one or more registered multimedia objects based on configuration parameters. Automatically executing configuration parameters may simplify user configuration requirements and assist the user in applying preferences without additional user intervention. In this way, precise volume level settings may be defined, stored, and applied in future uses. Moreover, heuristics defined in configuration parameters, as described in, e.g., FIG. 5, may adaptively apply volume level settings to a multitude of undefined situations without additional user configuration.

The aforementioned benefits and advantages are exemplary and other such benefits and advantages may be apparent in the previously-described non-limiting examples. While some aspects of the present disclosure may provide some or all of the aforementioned exemplary benefits and advantages, no aspect of the present disclosure should be construed to necessarily require any or all of the aforementioned exemplary benefits and advantages.

FIG. 2 is a block diagram illustrating further details of one example of computing device 2 shown in FIG. 1, in accordance with one or more aspects of the present disclosure. FIG. 2 illustrates only one particular example of computing device 2, and many other example embodiments of computing device 2 may be used in other instances.

As shown in the specific example of FIG. 2, computing device 2 includes one or more processors 40, memory 42, a network interface 44, one or more storage devices 46, input device 48, output device 50, and battery 52. Computing device 2 also includes an operating system 54. Computing device 2, in one example, further includes application 8 and one or more other applications 56. Application 8 and one or more other applications 56 are also executable by computing device 2. Each of components 40, 42, 44, 46, 48, 50, 52, 54, 56, and 8 may be interconnected (physically, communicatively, and/or operatively) for inter-component communications.

Processors 40, in one example, are configured to implement functionality and/or process instructions for execution within computing device 2. For example, processors 40 may be capable of processing instructions stored in memory 42 or instructions stored on storage devices 46.

Memory 42, in one example, is configured to store information within computing device 2 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 2 (e.g., application 8 and/or one or more other applications 56) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes a network interface 44. Computing device 2, in one example, utilizes network interface 44 to communicate with external devices via one or more networks, such as one or more wireless networks. Network interface 44 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 2 utilizes network interface 44 to wirelessly communicate with an external device (not shown) such as a server, mobile phone, or other networked computing device.

Computing device 2, in one example, also includes one or more input devices 48. Input device 48, in some examples, is configured to receive input from a user through tactile, audio, or video feedback. Examples of input device 48 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 50 may also be included in computing device 2. Output device 50, in some examples, is configured to provide output to a user using tactile, audio, or video stimuli. Examples of output device 50 include display 4 and audio device 6 of FIG. 1. Output device 50, in one example, includes a presence-sensitive screen, sound card, audio speaker, video graphics adapter card, or any other type of device for converting a signal into an appropriate form understandable to humans or machines. Additional examples of output device 50 include a cathode ray tube (CRT) monitor, a liquid crystal display (LCD), or any other type of device that can generate intelligible output to a user.

Computing device 2, in some examples, include one or more batteries 52, which may be rechargeable and provide power to computing device 2. Battery 52, in some examples, is made from nickel-cadmium, lithium-ion, or other suitable material.

Computing device 2 may include operating system 54. Operating system 54, in some examples, controls the operation of components of computing device 2. For example, operating system 54, in one example, facilitates the interaction of application 8 with processors 40, memory 42, network interface 44, storage device 46, input device 48, output device 50, and battery 52.

As shown in FIG. 2, application 8 may include an audio control module 10 described in FIG. 1. Audio control module 10 may include program instructions and/or data that are executable by computing device 2. For example, audio control module 10 may include instructions that cause application 8 executing on computing device 2 to perform one or more of the operations and actions described in FIGS. 1-5. In some examples, audio control module 10 may be a part of an operating system executing on computing device 2. In some examples, audio control module 10 may communicate with operating system 54 that receives input from one or more input devices 48 of computing device 2.

Computing device 2 may include an object identification repository 12 and/or parameter repository 14. In some examples, repositories 12, 14 may be caches, lookup tables, or other suitable data structures. In other examples, repositories 12, 14 may include Relational Database Management System (RDBMS) software. In one example, repositories 12, 14 may be a relational database and accessed using a Structured Query Language (SQL) interface that is well known in the art. Database 14 may alternatively be stored on a separate networked computing device and may be accessible via a network interface or system bus of computing device 2. Database 14 may in other examples be an Object Database Management System (ODBMS), Online Analytical Processing (OLAP) database or other suitable data management system.

Any applications, e.g., application 8 or other applications 56, implemented within or executed by computing device 2 may be implemented or contained within, operable by, executed by, and/or be operatively/communicatively coupled to components of computing device 2, e.g., processors 40, memory 42, network interface 44, storage devices 46, input devices 48, output devices 50, and/or batteries 52.

Figure 3:
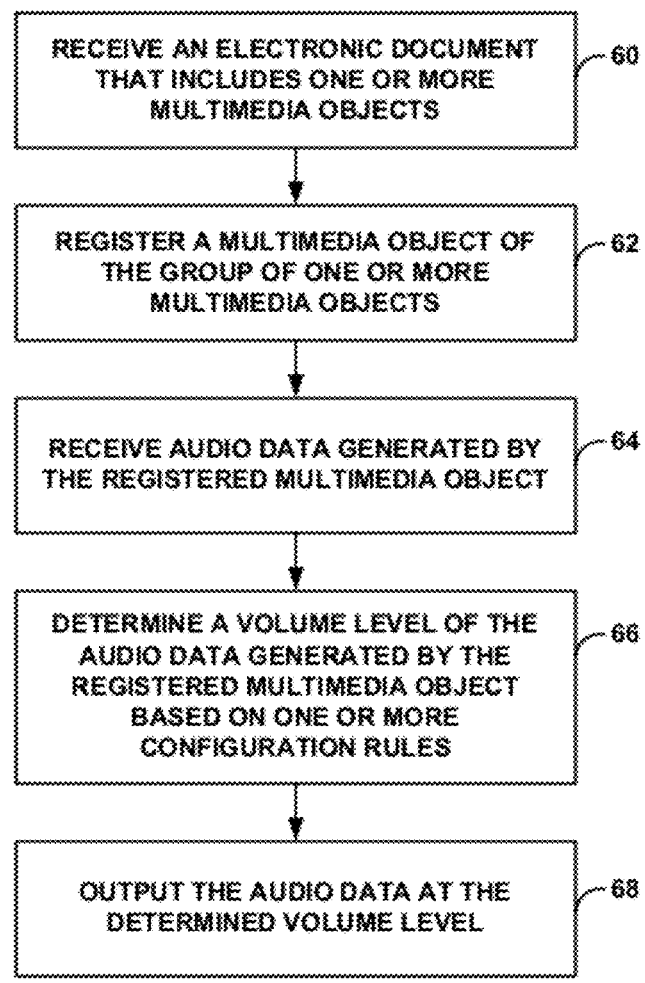
FIG. 3 is a flow diagram illustrating an example method that may be performed by a computing device to perform audio control of one or more multimedia objects, in accordance with one or more aspects of the present disclosure.

FIG. 3 is a flow diagram illustrating an example method that may be performed by a computing device to perform fine-grain audio control of one or more multimedia objects. For example, the method illustrated in FIG. 3 may be performed by computing device 2 shown in FIGS. 1 and/or 2.

The method of FIG. 3 includes, receiving an electronic document that includes a group of one or more multimedia objects capable of generating audio data (60); registering a multimedia object of the group of one or more multimedia objects, wherein registering the multimedia object includes storing a multimedia object identifier that identifies the multimedia object (62); receiving audio data generated by the registered multimedia object (64); determining, by a computing device, a volume level of the audio data based on one or more configuration parameters, wherein the one or more configuration parameters define one or more volume levels associated with the multimedia object identifier (66); and outputting, to an output device, the audio data at the determined volume level (68).

In one example, the method includes, registering a second multimedia object of the group of one or more multimedia objects, wherein registering the second multimedia object includes storing a second multimedia object identifier that identifies the second multimedia object; receiving second audio data generated by the second registered multimedia object; determining, by the computing device, a volume level of the second audio data based on the one or more configuration parameters, wherein the one or more configuration parameters further define one or more volume levels associated with the second multimedia object identifier; and outputting, to the output device, the second audio data at the determined second volume level.

In one example, the method includes, determining, by the computing device, that the second registered multimedia object comprises a dominant multimedia object based on a dominant heuristic, wherein the dominant heuristic indicates that the second registered multimedia object is a most probable multimedia object of the group of multimedia objects to be focused on by a user; and in response to determining that the second registered multimedia object comprises the dominant multimedia object, executing, by the computing device, at least one configuration parameter of the one or more configuration parameters to change a volume level of at least one of the one or more multimedia objects. In one example, the method includes, the at least one configuration parameter of the one or more configuration parameters defines a mute volume level indicating no volume, and the method further includes, associating, by the computing device, the mute volume level with each multimedia object of the group of one or more multimedia objects except the dominant multimedia object.

In one example, the dominant heuristic is based on a spatial position of the second multimedia object in the electronic document. In one example, the dominant heuristic is based on the dominant heuristic is based on a content type of the second multimedia object. In one example, the dominant heuristic is based on comparing a first spatial size of the multimedia object relative to a second spatial size of the second multimedia object.

In one example, the method includes determining, by the computing device, that the registered multimedia object is displayed in an inactive region of a graphical user interface of the computing device, wherein the inactive region is not visible to the user; determining, by the computing device, that the second registered multimedia object is displayed in an active region of the graphical user interface of the computing device, wherein the active region is visible to the user; and determining, by the computing device, that the second registered multimedia object comprises dominant multimedia based on the second registered multimedia object being displayed in the active region.

In one example, the method includes determining, by the computing device, that a sound device of the computing device is receiving the audio data; and assigning, by the computing device, the mute volume level to each registered multimedia object of the one or more multimedia objects, wherein the mute level volume indicates no volume. In one example, the sound device comprises a sound card or an audio speaker of the computing device.

In one example, the method includes registering the multimedia object of the group of one or more multimedia objects further comprises: scanning, by the computing device, the electronic document to identify one or more multimedia tags associated with the multimedia object; and responsive to identifying the one or more multimedia tags, registering, by the computing device, the multimedia object based on the one or more multimedia tags. In one example, the one or more multimedia tags indicate a content type of the multimedia object. In one example, the method includes determining, by the computing device, that an application executing on the computing device is accessing a sound device of the computing device; generating, by the computing device, a request for exclusive access to the sound device; and sending, by the computing device, the request to the sound device.

In one example, the method includes displaying, by the computing device, an audio control panel that includes a volume selector indicating the volume level of the multimedia object, wherein the volume selector indicates a range of selectable volume levels; receiving, by the computing device, a user input to select a second volume level of the volume selector associated with the multimedia object; and outputting, to the output device, the audio data at the second volume level.

In one example, the method includes generating, by the computing device, a preference heuristic that is based on an attribute of the multimedia object and the second volume level; registering, by the computing device, a second multimedia object of the group of one or more multimedia objects, wherein the second multimedia object includes the attribute of the multimedia object; and in response to determining that the second registered multimedia object includes the attribute of the multimedia object, assigning, by the computing device, the second volume level to the second multimedia object based on the preference heuristic. In one example, the attribute further comprises a multimedia type or a domain name of the multimedia object.

In one example, the method includes displaying, by the computing device, a first representation of the multimedia object identifier in the audio control panel; and displaying, by the computing device, a second representation of the multimedia object identifier at the multimedia object, wherein the multimedia object is displayed in the electronic document. In one example, the multimedia object includes an animation that includes audio content.

Figure 4:
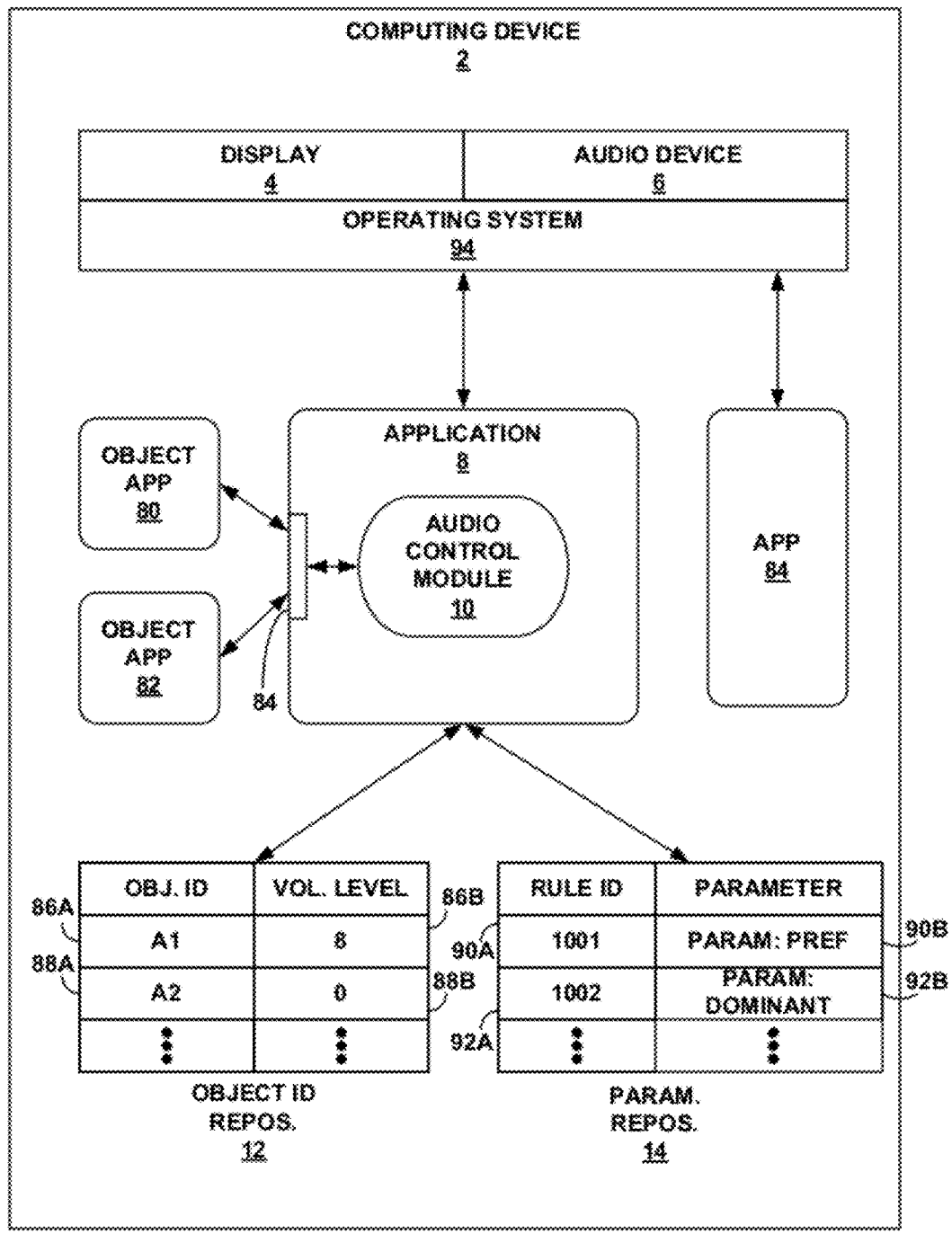
FIG. 4 is a block diagram illustrating an example of a computing device that may be configured to execute one or more applications, in accordance with one or more aspects of the present disclosure.

FIG. 4 is a block diagram illustrating an example of a computing device 2 that may be configured to execute one or more applications, e.g., application 8, in accordance with one or more aspects of the present disclosure. As shown in FIG. 4, computing device 2 and the various components included in FIG. 4 may include similar properties and characteristics as described in FIGS. 1 and 2 unless otherwise described hereinafter. As shown in FIG. 4, computing device 2 may include display 4, audio device 6, application 8, object application 80, object application 82, application 84, object identifier repository 12, and parameter repository 14.

As previously described in FIG. 1, application 8 may, in some examples, include functionality to render some but not all types of content included in a document. In examples where application 8 does not include functionality to render content of a particular type, e.g., application 8 does not natively support the content type, application 8 may execute a separate application to render such content. As shown in FIG. 4, application 8 may execute object applications 80, 82, which may include functionality to render content of multimedia objects not supported by application 8. In one example, object applications 80, 82 may be child processes of application 8. In some examples, object applications 80, 82 may send audio data of multimedia objects to audio device 6 using one or more Application Programming Interfaces (API) 84 provided by application 8.

As shown in FIG. 4, application 8 may further send and receive information included in object identifier repository 12. In some examples, object identifier repository 12 may include one or more multimedia object identifiers and one or more corresponding volume levels. In this way, application 8 may store, retrieve, and monitor volume levels of each multimedia object. For example, as shown in FIG. 4, object identifier repository 12 may include a multimedia object identifier 86A ("A1") and a corresponding volume level 86B ("8"). Multimedia object identifier 86A may identify a multimedia object included in a document. In some examples, multimedia object identifier 86A may be associated with volume level 86B. Thus, in one example, audio data generated by a multimedia object associated with identifier 86A may be output by audio device 6 at a volume level of 8. Similarly, audio data generated by a multimedia object associated with identifier 88A may be output by audio device 6 at a volume level of 0, e.g., no volume (muted).

As shown in FIG. 4, application 8 may further send and receive information included in parameter repository 14. In some examples, parameter repository 14 may include one or more configuration parameters that may be applied by audio control module 10 of application 8. In one example, a parameter 90B may be associated with a parameter identifier 1001. Configuration parameter 90B may define a user preference ("PARAM.: PREF") associated with a particular multimedia object. Configuration parameter 92B may define a dominant heuristic ("PARAM.: DOMINANT") as further described in FIG. 4. Audio control module 10, as shown in FIG. 4, may access parameter repository 14 to automatically apply configuration parameters associated with various registered multimedia objects.

In some examples, multiple applications on computing device 2 may each compete for access to audio device 6. For example, as shown in FIG. 4, application 8 and application 84 may each send audio data to audio device 6. In some examples, audio control module 10 may determine application 84 is accessing audio device 6 of computing device 2. For example, audio control module 10 may query an operating system executing on computing device 2 and/or audio device 6 to determine if one or more applications may be accessing audio device 6. In other examples, an operator system executing on computing device 2 may inform module 10 that one or more applications may be accessing audio device 6. In response to determining application 84 may be accessing audio device 6, audio control module 10 may generate a request for exclusive access audio device 6, which may be sent to audio device 6, a device driver of audio device 6, and/or operating system 94. Upon receiving the request from application 8, audio device 6 6 may only output sound for audio data from application 8. In this way, audio control module 10 may obtain exclusive access to audio device 6. In some examples, audio control module 10 may request exclusive access upon the occurrence of one or more conditions specified in one or more configuration parameters, e.g., when a user chooses an exclusive selector as shown in FIG. 1.

In some examples, a user may wish to hear audio data from application 84 but may not wish to hear audio data from multimedia objects registered with audio control 10. Thus, in one example, audio control module 10 may determine whether audio device 6 is presently receiving audio data from application 84. For example, audio control module 10 may send a query to an operating system executing on computing device 2 and/or audio device 6. Responsive to data received by audio control module 10 and based on the query, audio control module 10 may determine a mute volume level that indicates no volume. Audio control module 10 may assign the mute volume level to each registered multimedia object, thereby minimizing or eliminating disruption of that may be generated by audio data provided by application 84 to audio device 6.

Figure 5:
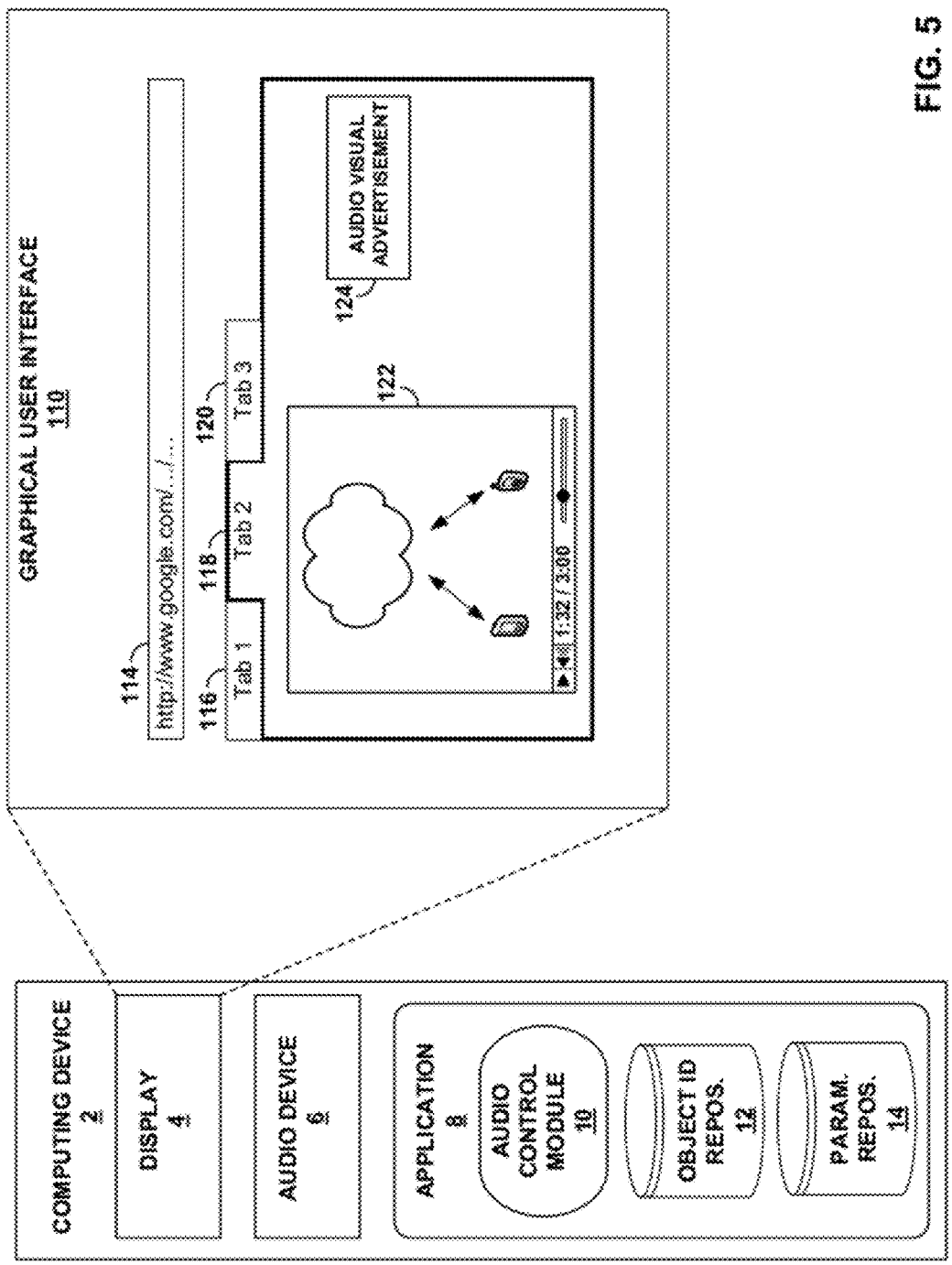
FIG. 5 is a block diagram illustrating an example of a computing device that may be configured to execute one or more applications, in accordance with one or more aspects of the present disclosure.

FIG. 5 is a block diagram illustrating an example of a computing device 2 that may be configured to execute one or more applications, e.g., application 8, in accordance with one or more aspects of the present disclosure. As shown in FIG. 5, computing device 2 and the various components included in FIG. 5 may include similar properties and characteristics as described in FIGS. 1 and 2 unless otherwise described hereinafter. As shown in FIG. 5, computing device 2 may include display 4, audio device 6, application 8, object identifier repository 12, and parameter repository 14.

As shown in FIG. 5, display 4 may display graphical user interface 110 generated by application 8. In example of FIG. 5, application 8 may be a web browser as described herein. GUI 110 may include an address bar 114 that may enable a user to input one or more Uniform Resource Locators (URLs), which may be used to retrieve resources, e.g., an HTML document. As shown in FIG. 5, GUI 110 may display one or more tabbed windows. Each tabbed window may be identified by a tab, e.g., tab 118. A tabbed window, in some examples, may display content of an HTML document. In this way, a user may open two or more documents in different tabbed windows using the same application. As shown in FIG. 5, GUI 110 includes tabbed windows 116, 118, and 120. In some examples, an active tabbed window may be presently viewable by a user. An inactive tabbed window may be a tabbed window not presently viewable by a user. Thus, as shown in FIG. 5, tabbed window 118 may be an active tabbed window because the contents of tabbed window 118 are visible to a user.

As shown in FIG. 5, tabbed window 118 may include multimedia objects 122 and 124. Each multimedia object may generate audio data that may be sent by application 8 to audio device 6. In some examples, audio control module 10 may determine that one of multimedia object 122 or multimedia 124 comprises a dominant multimedia object. A dominant multimedia object may include one or more multimedia objects to which a user is most likely to direct his/her focus. Thus, in some examples, one or more dominant multimedia objects may be the most probable multimedia objects of a user's focus. In some examples, one or more dominant heuristics may be used by audio control module 10 to identify which multimedia object of a group of one or more multimedia objects may be dominant multimedia objects. A dominant heuristic may include one or more facts that may indicate a user is more or less likely to focus on a multimedia object. In some examples, one or more dominant heuristics may be stored as configuration parameters in parameter repository 14 and applied by audio control module 10 to one or more registered multimedia objects.

In one example, as shown in FIG. 5, multimedia object 122 (hereinafter video object 122) and multimedia object 124 (hereinafter advertisement object 124) may each be registered with audio control module 10 according to techniques of the present disclosure. In the current example, audio control module 10 may query parameter repository 14 to identify a configuration parameter that includes a dominant heuristic. Executing the configuration parameter, audio control module 10 may determine one of video object 122 or advertisement object 124 is the dominant multimedia object. Upon determining the dominant multimedia object, audio control module 10 may execute one or more configuration parameters to, e.g., change the volume level of one or more multimedia media objects. For example, a configuration parameter may specify that any multimedia object that is not the dominant multimedia object will be associated with a mute volume level that indicates no volume. Thus audio control module 10, upon detecting the dominant multimedia object, may mute all other multimedia objects thereby enable to the user to focus on the audio content of the dominant multimedia object.

In some examples, a dominant heuristic may be based on a spatial position of a multimedia object in a document. For example, an HTML document may display one or more multimedia objects in a two-dimensional space. In some examples, an author of an HTML document may place a multimedia object that the author intends to have the highest probability of attracting the user's focus at the center of the HTML document. The author may include additional multimedia objects in other different locations of the two-dimensional space. In one example, the dominant heuristic may include a highest probability spatial position of the two-dimensional space on which the user is most likely to focus. In such examples, audio control module 10 may determine a spatial position of each multimedia object and further determine the multimedia media object that is the shortest distance from the highest-probability spatial position is the dominant multimedia object.

In some examples, a dominant heuristic may be based on a content type of a multimedia object. For example, a user may specify one or more configuration parameters that prioritize a list of possible content types of multimedia objects. In one example, when one or more multimedia objects are included in a document, audio control module 10 may determine a multimedia object with a highest priority content type may be the dominant multimedia object. In still other examples, a dominant heuristic may be based on the relative spatial size of two or more multimedia objects. For example, a multimedia object may be displayed by display 4 of computing device 2. Each multimedia object may include a spatial area that may be specified by the multimedia objects width and height. A dominant heuristic in one example, may indicate the multimedia object with the largest spatial area is the dominant multimedia object. For example, as shown in FIG. 5, audio control module 10 may determine video object 22 is the dominant multimedia object because it has a larger spatial area than advertisement object 124.

In other examples, a dominant heuristic may be based whether a multimedia object is in an active or inactive region of a graphical user interface. For example, a user may not desire to hear audio data from a multimedia object included in an inactive region of a graphical user interface. As shown in FIG. 5, tabbed window 118 may include an active region of GUI 110 because content of tabbed window 118, e.g., video object 122 and advertisement object 124, may be visible. Inactive regions of GUI 110 may include tabbed windows 116 and 120, which may include multimedia objects presently not visible to a user. In example, a dominant heuristic may determine a multimedia object is a dominant multimedia object because the multimedia object is included in an active region of GUI 110. Thus, in the example of FIG. 5, audio control module 10 may determine that video object 122 and advertisement object 124 are dominant multimedia objects based on a dominant heuristic that indicates multimedia objects of an active region are dominant multimedia objects.

In some examples, aspects of the present disclosure may enable application 8 to track, store, and adaptively apply user preferences. For example, a user, over a time period and/or number of instances of using an application, may specify one or more configuration parameters based on the user's preferences that correspond to one or more multimedia objects. Thus, in one example, a user may indicate that audio data of multimedia objects associated with a particular content type may preferably be associated with a particular volume level. In other examples, a user may indicate that audio data of multimedia objects originating from a particular network domain be associated with a particular volume level. More generally, a user may generate one or more preferences defined in configuration parameters based on any attribute of a multimedia object.

Audio control module 10, as shown in FIG. 5, may enable a user to generate one or more configuration parameters based on user preferences. In some examples, audio control module 10 may automatically store each configuration parameter in parameter repository 14 as a user indicates each preference. In some examples, a configuration parameter may be based on a state of one or more multimedia objects and corresponding volume levels defined by the user. In other examples, audio control module 10 may prompt the user to store, modify, or delete a user preference. In one example, a configuration parameter may be based on an attribute of a multimedia object, and a corresponding volume level.

Audio control module 10 may, in some examples, use one or more configuration parameters to generate a preference heuristic. A preference heuristic may, in one example, be based on one or more attributes and/or one or more volume levels defined in one or more configuration parameters. Thus, in one example, audio control module 10 may register one or more multimedia objects as previously defined herein. Audio control module 10 may subsequently generate and/or retrieve one or more preference heuristics based on configuration parameters stored in parameter repository 14. Consequently, audio control module 10 may, for example, assign a volume level to a multimedia object based on an attribute of the multimedia object that is associated with the preference heuristic. In this way, audio control module 10 may adaptively track, store, and execute preference heuristics to automatically configure volume levels associated with multimedia objects based on user preferences. Thus, a user may not be required to manually configure a volume level of a multimedia object that includes one or more attributes associated with one or more preference heuristics. In such examples, audio control module 10 may use the one or more preference heuristics to automatically configure the volume level of the multimedia object.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

The invention claimed is:

1. A method comprising:
receiving an electronic document that includes at least two multimedia objects capable of generating audio data;
scanning, by the computing device, the electronic document to identify one or more multimedia tags associated with the at least two multimedia objects;
for each of the at least two multimedia objects, and responsive to identifying a respective multimedia tag of the one or more multimedia tags that is associated with a respective multimedia object of the at least two multimedia objects, registering the respective multimedia object of the at least two multimedia objects, wherein registering the respective multimedia object comprises storing a multimedia object identifier for the respective multimedia object that uniquely identifies the respective multimedia object of the at least two multimedia objects included in the electronic document;
receiving audio data associated with each multimedia object of the at least two multimedia objects;
determining, by a computing device, a volume level of audio data of one of the at least two multimedia objects based on one or more configuration parameters, wherein the one or more configuration parameters define one or more volume levels associated with the multimedia object identifier that uniquely identifies the one of the at least two multimedia objects; and
outputting, to an output device, the audio data at the determined volume level.

2. The method of claim 1, wherein the one of the at least two multimedia objects is a first multimedia object, the method further comprising:
receiving second audio data generated by a second registered multimedia object of the at least two multimedia objects;
determining, by the computing device, a volume level of the second audio data based on the one or more configuration parameters, wherein the one or more configuration parameters further define one or more volume levels associated with the second multimedia object identifier; and
outputting, to the output device, the second audio data at the determined second volume level.

3. The method of claim 2, further comprising:
    determining, by the computing device, that the second registered multimedia object comprises a dominant multimedia object based on a dominant heuristic, wherein the dominant heuristic indicates that the second registered multimedia object is a most probable multimedia object of the at least two multimedia objects to be focused on by a user; and
    in response to determining that the second registered multimedia object comprises the dominant multimedia object, executing, by the computing device, at least one configuration parameter of the one or more configuration parameters to change a volume level of at least one of the one or more multimedia objects.

4. The method of claim 3, wherein the at least one configuration parameter of the one or more configuration parameters defines a mute volume level indicating no volume, and wherein the method further comprises:
    associating, by the computing device, the mute volume level with each multimedia object of the at least two multimedia objects except the dominant multimedia object.

5. The method of claim 3, wherein the dominant heuristic is based on a spatial position of the second multimedia object in the electronic document.

6. The method of claim 3, wherein the dominant heuristic is based on a content type of the second multimedia object.

7. The method of claim 3, wherein the one of the at least two multimedia objects is a first multimedia object, wherein the dominant heuristic is based on comparing a first spatial size of the first multimedia object relative to a second spatial size of the second multimedia object.

8. The method of claim 3, wherein the one of the at least two multimedia objects is a first multimedia object, wherein the dominant heuristic is based at least on:
    determining, by the computing device, that the first registered multimedia object is displayed in an inactive region of a graphical user interface of the computing device, wherein the inactive region is not visible to the user;
    determining, by the computing device, that the second registered multimedia object is displayed in an active region of the graphical user interface of the computing device, wherein the active region is visible to the user; and
    determining, by the computing device, that the second registered multimedia object comprises dominant multimedia based on the second registered multimedia object being displayed in the active region.

9. The method of claim 1, further comprising:
    determining, by the computing device, that a sound device of the computing device is receiving the audio data; and
    assigning, by the computing device, a mute volume level to each registered multimedia object of the at least two multimedia objects, wherein the mute level volume indicates no volume.

10. The method of claim 9, wherein the sound device comprises a sound card or an audio speaker of the computing device.

11. The method of claim 1, wherein the one or more multimedia tags each indicate a content type of the one of the at least two multimedia objects.

12. The method of claim 1, further comprising:
    determining, by the computing device, that an application executing on the computing device is accessing a sound device of the computing device;
    generating, by the computing device, a request for exclusive access to the sound device; and
    sending, by the computing device, the request to the sound device.

13. The method of claim 1, further comprising:
    displaying, by the computing device, an audio control panel that includes a volume selector indicating the volume level of one of the least two multimedia objects, wherein the volume selector indicates a range of selectable volume levels;
    receiving, by the computing device, a user input to select a second volume level of the volume selector associated with the one of the least two multimedia objects; and
    outputting, to the output device, the audio data at the second volume level.

14. The method of claim 13, wherein the one of the at least two multimedia objects is a first multimedia object, the method further comprising:
    generating, by the computing device, a preference heuristic that is based on an attribute of the first multimedia object and the second volume level;
    registering, by the computing device, a second multimedia object of the group of one or more multimedia objects, wherein the second multimedia object includes the attribute of the multimedia object; and
    in response to determining that the second registered multimedia object includes the attribute of the first multimedia object, assigning, by the computing device, the second volume level to the second multimedia object based on the preference heuristic.

15. The method of claim 14, wherein the attribute further comprises a multimedia type or a domain name of the multimedia object.

16. The method of claim 13, further comprising:
    displaying, by the computing device, a first representation of the multimedia object identifier in the audio control panel; and
    displaying, by the computing device, a second representation of the multimedia object identifier at the one of the at least two multimedia objects, wherein the one of the at least two multimedia objects is displayed in the electronic document.

17. The method of claim 1, wherein the one of the at least two multimedia objects comprises an animation that includes audio content.

18. A non-transitory computer-readable storage medium encoded with instructions that, when executed, cause one or more processors of a computing device to perform operations comprising:
    receiving an electronic document that includes at least two multimedia objects capable of generating audio data;
    scanning the electronic document to identify one or more multimedia tags associated with the at least two multimedia objects;
    for each of the at least two multimedia objects, and responsive to identifying a respective multimedia tag of the one or more multimedia tags that is associated with a respective multimedia object of the at least two multimedia objects, registering the respective multimedia object of the at least two multimedia objects, wherein registering the respective multimedia object comprises storing a multimedia object identifier for the respective multimedia object that uniquely identifies the respective multimedia object of the at least two multimedia objects included in the electronic document;
    receiving audio data associated with each multimedia object of the at least two multimedia objects;

determining, by a computing device, a volume level of audio data of one of the at least two multimedia objects based on one or more configuration parameters, wherein the one or more configuration parameters define one or more volume levels associated with the multimedia object identifier that uniquely identifies the one of the at least two multimedia objects; and outputting, to an output device, the audio data at the determined volume level.

19. A computing device, comprising:
one or more processors,
wherein the one or more processors are configured to:
receive an electronic document that includes at least two multimedia objects capable of generating audio data;
scan the electronic document to identify one or more multimedia tags associated with the at least two multimedia objects;
for each of the at least two multimedia objects, and responsive to identifying a respective multimedia tag of the one or more multimedia tags that is associated with a respective multimedia object of the at least two multimedia objects, register the respective multimedia object of the at least two multimedia objects, wherein registering the respective multimedia object comprises storing a multimedia object identifier for the respective multimedia object that uniquely identifies the respective multimedia object of the at least two multimedia objects; and
receive audio data associated with each multimedia object of the at least two multimedia objects included in the electronic document;
determine a volume level of audio data of one of the at least two multimedia objects based on one or more configuration parameters, wherein the one or more configuration parameters define one or more volume levels associated with the multimedia object identifier that uniquely identifies the one of the at least two multimedia objects; and an output device to output the audio data at the determined volume level.

20. A method comprising:
receiving an electronic document that includes a group of two or more multimedia objects capable of generating audio data;
scanning the electronic document to identify one or more multimedia tags associated with the group of two or more multimedia objects;
for each of the at least two multimedia objects, and responsive to identifying a first multimedia tag that is associated with a first multimedia object of the group of two or more multimedia objects and a second multimedia tag that is associated with a second multimedia object of the group of two or more multimedia objects, registering the first multimedia object and the second multimedia object of the group with an application, wherein registering the first multimedia object comprises storing a first multimedia object identifier that uniquely identifies the first multimedia object, and wherein registering the second multimedia object comprises storing a second multimedia object identifier that uniquely identifies the second multimedia object;
receiving first audio data generated by the first multimedia object and second audio data generated by the second multimedia object;
receiving, during execution of the application, a first configuration parameter from a user that indicates a first volume level of the first multimedia object;
receiving, during execution of the application, a second configuration parameter from the user that indicates a second volume level of the second multimedia object;
outputting, to an output device, the first audio data at the first volume level; and
outputting, to the output device, the second audio data at the second volume level.

* * * * *